M. ENGELN.
EXPANSIBLE AND CONTRACTIBLE CORE FOR MAKING CEMENT CONDUCTORS.
APPLICATION FILED JUNE 15, 1908.
914,032.
Patented Mar. 2, 1909.
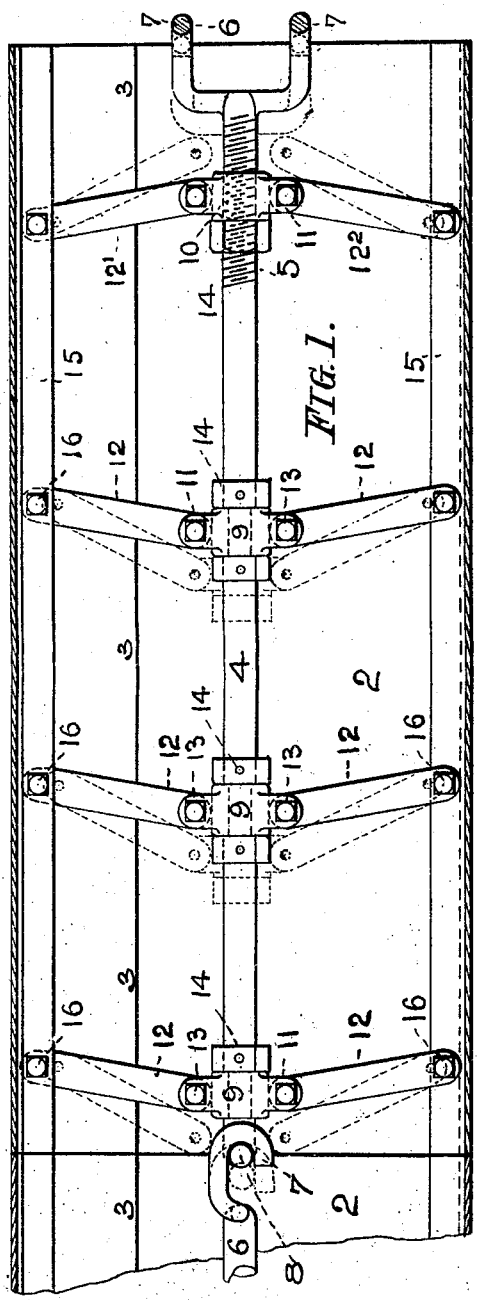
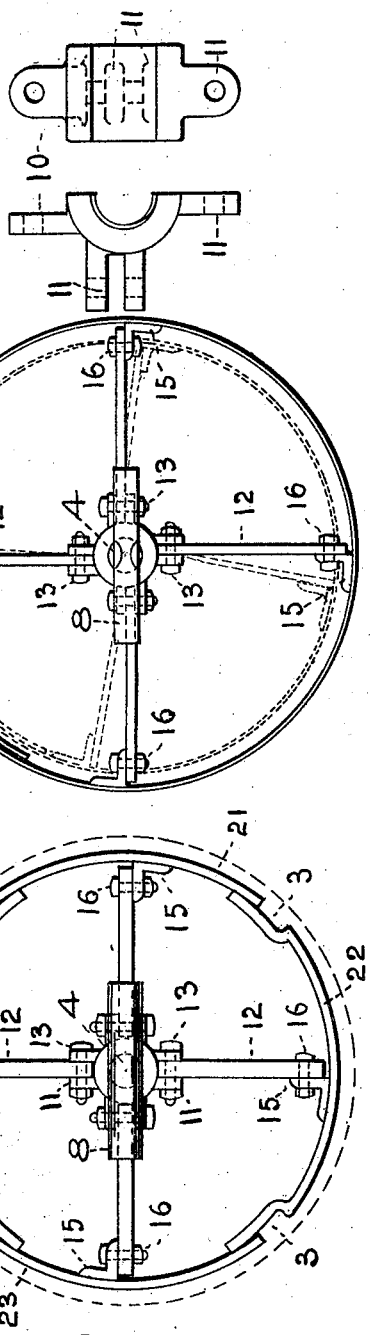
Witnesses:
CBKnudsen
A. G. Peterson
Inventor:
Mathias Engeln,
By Michael J. Stark & Sons,
Attorneys.

UNITED STATES PATENT OFFICE.

MATHIAS ENGELN, OF McHENRY, ILLINOIS.

EXPANSIBLE AND CONTRACTIBLE CORE FOR MAKING CEMENT CONDUCTORS.

No. 914,032.

Specification of Letters Patent.

Patented March 2, 1909.

Application filed June 15, 1908. Serial No. 438,580.

*To all whom it may concern:*

Be it known that I, MATHIAS ENGELN, a citizen of the United States, and a resident of McHenry, in the county of McHenry, in the State of Illinois, have invented certain new and useful Improvements in Expansible and Contractible Cores for Making Cement Conductors; and I do hereby declare that the following description of my said invention, taken in connection with the accompanying sheet of drawings, forms a full, clear, and exact specification, which will enable others skilled in the art to which it appertains to make and use the same.

This invention has general reference to improvements in expansible and contractible cores for cement-pipe production; and it consists, essentially, in the novel and peculiar combination of parts and details of construction, as hereinafter first fully set forth and described and then pointed out in the claims.

In the drawings already referred to, which serve to illustrate this invention more fully, Figure 1 is a longitudinal sectional plan of this expansible and contractible core. Fig. 2 is an end-elevation of the same. Fig. 3 is a similar view of a modified form of this device. Fig. 4 is a side-elevation, and Fig. 5 a plan of one of the collars employed in this apparatus.

Like parts are designated by corresponding symbols of reference in all the figures.

The object of this invention is the production of an efficient, serviceable and durable core for use in the production, or laying of, cement-conduits or pipes, sewer-pipes, &c.

To attain these results I construct this core of a sheet-metal cylindrical shell 2, having a widely-overlapping longitudinal seam 3 as clearly shown in the figures. Within this shell and in its central longitudinal axis there is located a shaft 4, one end of which is externally screw-threaded at 5, and having at this screw-threaded end a U-shaped handle 6, the members of which terminate in hooks or crooks 7, as clearly illustrated in Fig. 1. The opposite end of this shaft 4 has a T-handle 8, adapted to coöperate with the U-shaped handle 6 in a manner hereinafter to be referred to; said handles being preferably formed integral with said shaft. Upon this shaft 4 there are placed a series of hubs 9, and near the end, and at the screw-threaded portion 5 there is placed an internally screw-threaded hub 10, all these various hubs being provided with lugs forming double-eyes, 11, wherein are pivoted links 12, by means of screws, bolts or rivets 13. On both sides of these collars 9 there are placed locking-collars 14, to prevent lateral movement of these collars or hubs 9 upon the shaft, 4. In the shell 2 there are a series of longitudinal angle-bars 15, securely riveted to the shell 2, and provided at proper intervals with holes through which bolts or rivets 16 are passed that connect with the links 12 at their ends opposite to those which engage the collars or hubs 9 and 10.

The internally screw-threaded hub 10, as well as the hubs 9, may be formed integral with the lugs or double-eyes 11 and, with the locking-collars 14 be placed upon the shaft 4 before the handle 6 is secured to said shaft. I may, however, make these collars of two similar halves, as shown in Figs. 4 and 5 where the bolts 13 serve also to securely hold the two halves together in addition to their serving as pivots for the links 12.

In Fig. 3 I have shown a modification of the device heretofore described which consists in making the shell 2 of a series of longitudinal sections 2, 21, 22, and 23, each section overlapping its adjacent section a sufficient distance to enable the sections being moved radially from the shaft and thereby to increase or decrease the external diameter of the shell in a manner readily comprehended.

In sewerage work, where the sewer-piping is made of concrete or cement *in loco*, that is to say in the trench, and, therefore, continuous, the expanded core is placed into position and the cement &c. placed around it to form a section of such pipe. Now another core of the same diameter is abutted against the first-placed core and the making of the sewer-pipe &c. continued, sections of expanded cores being added as often as necessary, care being taken that the T-handle on the central shaft of one section properly engages the hook at the next succeeding section, as shown in Fig. 1. When the first-made section has set sufficiently to allow its core being withdrawn, the hook-formed handle 6 on the section of the core last placed into position is turned to revolve the screw-threaded shaft and thereby to move all the hubs in the various sections into a different angular position resulting in the drawing inwardly of the various shells and reducing their diameter, and by pulling the sections ahead and again expanding the shells to their original diameter the making of the piping can be continued without adding additional sections of the core.

In mentioning sections of the core in the foregoing description I desire it understood that it refers to a complete shell with its internal parts as shown in Fig. 1 where such a complete shell or section, and a short portion of an adjacent section are shown.

It is evident that the diameter of the sections will be made to suit the various diameters of piping which it is desired to produce and that when large diameters are required, I may use a greater number of hubs 9 and links 12 without departing from the essential features of this device.

I will call attention to the fact that when the shell 2 is formed in a suitable tube-former, it is so rolled that it occupies its smallest diameter. This will place the shell in tension so that, after it has been expanded, it will return or contract to its smaller diameter when the movement of the hubs and links permits of such contraction, thereby releasing the bolts 13 and 16 from any strain when the shell is being contracted.

I have shown in Fig. 1 in dotted lines the position of the hubs and links when the shell is contracted to its smallest diameter, and in Fig. 3 in dotted lines the shell in its largest diameter. It will be observed that, as shown in Fig. 1, the first set of links 12 are inclined in the opposite direction of the remaining sets of links. This set of links indicated by the reference-symbols 12¹ and 12² and the hub 10 (which is the only one in the series which is internally screw-threaded) will, therefore, move in the opposite direction from those of the remaining hubs and links and that, therefore, this set of links and their hub 10 form, as it were, an abutment to enable the oppositely disposed links to move and thereby the entire shell to contract or expand, as the case may be.

In order to enable the links to assume their varying angularity, the connections of the links in the double-eyes 11 and with the angle-bars 15 should be somewhat loose, or in other words, have some play, a matter which will be readily understood by reference to Fig. 2 where the contour of the shell when contracted and the position of the links is shown in dotted lines. In the drawings I have shown a cylindrical shell, but it is evident that the shell may be of oval, ovoid, or other similar shape if desired.

Having thus fully described my invention I claim as new and desire to secure to me by Letters Patent of the United States—

1. An expansible and collapsible core for making cement pipes *in situ*, consisting of a sheet-metal, open seamed shell having its longitudinal edges overlapping; a central, longitudinal shaft in said shell, there being a screw-threaded portion near one end of said shaft; an operating handle on said shaft; a series of hubs upon said shaft spaced a distance apart; a single, internally screw-threaded hub upon the screw-threaded portion of said shaft; collars fastened upon said shaft and on both sides of the before-mentioned series of hubs, there being radially-projecting double eyes on all the said hubs; a series of angle-bars longitudinally secured to the inner surface of said shell, and a series of links connecting the double eyes of the hubs with the angle bars in said shell.

2. In an expansible and contractible core for making cement-conductors, a metallic shell having an overlapping, longitudinal, open, seam; a central, longitudinal, shaft in said shell, there being a screw-threaded portion near one end of said shaft; a T-handle at one end of said shaft; a hook-shaped handle at the other end of said shaft, and means upon said shaft and connected with said shell whereby the latter may be expanded and contracted.

3. In an expansible and contractible core for making cement conductors, an expansible and contractible shell; a central, longitudinal shaft in said shell, circular in transverse section and having near one end a screw-threaded portion; a series of hubs upon the said shaft; a series of collars fastened upon said shaft on both sides of said hubs; an internally screw-threaded collar upon the threaded portion of said shaft; radially-projecting lugs on all of said collars and forming double eyes as stated; links in said double eyes and connecting said hubs to said shell, all of said hubs being composed of two identical and reversible parts; and bolts in said double eyes, whereby said bolts are adapted to hold the companion halves of said hubs together and form pivots for one end of said links.

In testimony that I claim the foregoing as my invention I have hereunto set my hand in the presence of two subscribing witnesses.

MATHIAS ENGELN.

Attest:
JAMES SANFORD,
JOE WILSON.